United States Patent
Schnell et al.

(10) Patent No.: US 6,735,168 B1
(45) Date of Patent: May 11, 2004

(54) METHOD AND ARCHITECTURE FOR PROVIDING TELEPHONY BETWEEN DATA NETWORKS AND PSTN

(75) Inventors: Mark G. Schnell, Apex, NC (US); Andrew L. Aczel, Palo Alto, CA (US); Richard Loveland, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/202,898

(22) PCT Filed: Jun. 25, 1997

(86) PCT No.: PCT/US97/10491
§ 371 (c)(1),
(2), (4) Date: Jul. 16, 1999

(87) PCT Pub. No.: WO97/50277
PCT Pub. Date: Dec. 31, 1997

Related U.S. Application Data

(60) Provisional application No. 60/020,432, filed on Jun. 25, 1996.

(51) Int. Cl.[7] .............................................. H04L 12/64
(52) U.S. Cl. ........................ 370/217; 370/352; 370/354
(58) Field of Search .............................. 370/352, 238, 370/354, 356, 373, 389, 395.1, 399, 395.3, 395.6, 493, 495, 537, 216, 217

(56) References Cited

U.S. PATENT DOCUMENTS

| | | | | |
|---|---|---|---|---|
| 5,539,744 A | * | 7/1996 | Chu et al. ................... 370/397 |
| 5,570,355 A | * | 10/1996 | Dail et al. .................. 370/60.1 |
| 5,661,790 A | * | 8/1997 | Hsu ....................... 379/209.01 |
| 5,671,215 A | * | 9/1997 | Foglar ......................... 370/227 |
| 5,708,702 A | * | 1/1998 | De Paul et al. .............. 370/426 |
| 5,883,891 A | * | 3/1999 | Williams et al. ............ 370/356 |

FOREIGN PATENT DOCUMENTS

DE 43 31 577 3/1995

OTHER PUBLICATIONS

Low, Colin, "The Internet Telephony Red Herring," May 15, 1996, XP 002043901, Hewlett Packard, pp. 1–15.*

L.M. Olsen, "Death of a Phone System" An Internet Viewpoint On Computer Telephony Integration, Proceedings The First Annual Conference on Emerging Technologies and Applications in Communications, pp. 131–133, (1996).

Z. Tsai et al., "Performance Analysis of Two Echo Control Designs in ATM Networks", IEEE / ACM Transactions on Networking, vol. 2, No. 1, pp. 30–39, (1994).

* cited by examiner

Primary Examiner—Melvin Marcelo
(74) Attorney, Agent, or Firm—R. Todd Morgan PLLC

(57) ABSTRACT

A method consistent with the present invention enables communicating telephonic data regarding a call over a data network. The method includes the steps of receiving data units from a first data network over redundant communication paths. Next, it is determined whether the received data units have an error. One of the received date units is then selected from one of the redundant communication paths determined not to have an error, and the selected data unit is forwarded to a second data network.

6 Claims, 12 Drawing Sheets

METHOD AND ARCHITECTURE FOR PROVIDING TELEPHONY BETWEEN DATA NETWORKS AND PSTN

This application claims the benefit of Provisional application Ser. No. 60/020,432, filed Jun. 25, 1996.

BACKGROUND OF THE INVENTION

A. Field of the Invention

This invention relates generally to methods for communicating data over a data network, and, more particularly, to a method that allows signaling data to be communicated over the data network.

B. Description of the Related Art

Common Channel Signaling (CCS) provides a dedicated supervisory network for segregating signaling information from voice and data information in a telecommunications network. CCS was developed to meet the increased demands placed on the public telecommunications network by the growing market for voice, data, and information services. Previous signaling systems sent call setup and routing information over the same trunk circuit used for voice transmission. With CCS, a single out-of-band channel conveys signaling information relating to call setup, routing, and network management, among other things. Signaling System No. 7 (SS7), an international protocol standard for CCS communications, creates a standard format for communicating signaling information in a CCS network (CCS7).

FIG. 1 diagrammatically illustrates a PSTN having a CCS7 network 110 and a voice network 130, each of which interfaces with a plurality of service switching points (SSPs) 120. SSPs 120 are located at a central office to provide CCS7 trunk signaling and the capability to query a database to determine call routing. CCS7 network 110 includes STPs 112 which route CCS7 messages between SSPs and STPs and control access to the CCS7 network. In addition, each SSP 120 is connected to voice network 130, such as a long-distance telephone network by voice trunks 132.

The emergence of desktop computing, local area networks (LANs), and the Internet, brought the desire to carry CCS7 signaling data over data networks. Significant cost savings to communications providers could be realized if the CCS7 signaling data could be reliably transmitted over the existing data networks. The savings would stem from not having to install and maintain separate Signaling Networks; which are known to be extremely expensive in a telephone network, due largely in part to the inherent complexity required to achieve the high degree of reliability.

Any approach using a data network to carry CCS7 signaling data must also consider the reliability of the message transfer. In today's data communication networks, reliable messaging of signaling data is generally performed by either: 1) utilizing a rigorous protocol implementation which corrects for lost messages; or 2) using fully duplicated transmission paths to minimize the impact of a break in one of the two transmission paths. In the most sensitive applications, such as in today's telephone CCS7 Signaling Networks, these methods are combined to obtain maximum reliability of message transfer. This approach has a number of drawbacks. First, providing a duplicated and segregated data network just for the signaling data is expensive. Second, the number of specialized CCS7 signaling data routers (i.e., the STPs) increases the expense and the complexity of the system as well.

Within the computer industry, a different communication network has emerged based on Local and Wide Area Networks (LANs & WANs). These networks achieve reliability not by duplicated physical communication paths, but by the network's ability to send messages based solely on a destination address and to have them arrive at the intended destination through a number of diverse routes. However, the network itself does not typically provide for guaranteed delivery of a particular message at the intended destination. The end points involved in a message exchange must, therefore, implement a rigorous protocol to detect lost messages and retransmit the detected lost messages. This is usually very processor and memory intensive, and the recovery of lost messages through retransmission is often slow-particularly when the network is geographically diverse, such as the Internet.

Some data communication networks today can support limited voice communications across a data network. FIG. 2 illustrates a data network 210, such as the Internet, connected to two telephony equipped personal computers (PC) 212 and 214. However, since data network 210 does not interface with a PSTN in this system, any communication of signaling data would be minimal and merely related to routing.

FIG. 3 illustrates a more advanced data network based system which supports voice communications. In FIG. 3, a telephone call connection path is formed for connecting a data network 310 to a PSTN 320 through a telephone gateway 350. A user of PC 312 on data network 310 may initiate a call by dialing the directory number (DN) of a telephone 322 on PSTN 320. PC 312 sends the DN in a message over data network 310 to a translation server 314, which uses the DN to determine the Internet protocol (IP) address of a gateway 350 closest to phone 322. Translation server 314 returns the IP address of gateway 350 to PC 312, which then sends the DN over data network 310 to phone gateway 350.

The system of FIG. 3, however, does not allow any signaling information (i.e., the calling party's name and number) to be delivered between a data network 310 and PSTN 320. In addition, since telephone 322 cannot originate and complete a call to a PC 312, businesses would still require a traditional phone to receive calls from clients and customers. '1-900' calls dialed by PC 312 would be problematic since PSTN 320 would view telephone gateway 350 as the originator of the call and not PC 312. This occurs since phone gateway 350 effectively looks like a telephone to PSTN 320 since it is connected to PSTN 320 by a link terminating on a line circuit at an end office switch of PSTN 320. Thus, this system is unable to communicate the full complement of signaling information between a data network and a PSTN, prohibiting data network users from taking full advantage PSTN services.

Therefore, the above communication systems are not able to reliably and cost effectively transmit the full complement of signaling information regarding a call between a data network and a PSTN. This poses a serious barrier to the merging or integration of computer based telephony and the traditional telephone network PSTN.

SUMMARY OF THE INVENTION

Systems and methods consistent with the present invention provide a universal, high speed, highly reliable gateway for enabling voice and signaling communication between a data network and a PSTN.

To achieve these and other advantages, a method of communicating telephonic data regarding a call over a data network, comprising the steps of: receiving data units from a first data network over redundant communication paths; determining whether the received data units have an error; selecting one of the received data units from one of the redundant communication paths determined not to have an error; and forwarding the selected data unit to a second data network.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

Embodiments of systems consistent with the present invention will now be described in detail. Wherever possible, the same reference numbers used throughout refer to the same or like parts.

Overview

Signaling servers consistent with this invention may be used to communicate signaling data in place of a CCS7 network or may be used to communicate voice data in place of a voice network, such as a typical long-distance telephone network. In, addition, such signaling servers also enable communication of voice and signaling data between a data network and a public switched telephone network (PSTN). The term "signaling data" refers to the supervisory signals used in a CCS7 network, and includes: call setup information, network management information, and class service information.

To increase the reliability of the communicated data, the signaling server receives and processes the voice and/or signaling data over a plurality of redundant communication paths. When transmitting data to the network connected to the signaling server, the signaling server checks the data of each communication path for errors, and selects the data from one of the paths which has no errors. The selected data is then forwarded to the connected network. When receiving data from the connected network, the signaling server replicates the data such that the same data is transmitted to the data network over each of the redundant communication paths.

Signaling Server Network Architecture

Figure 1:
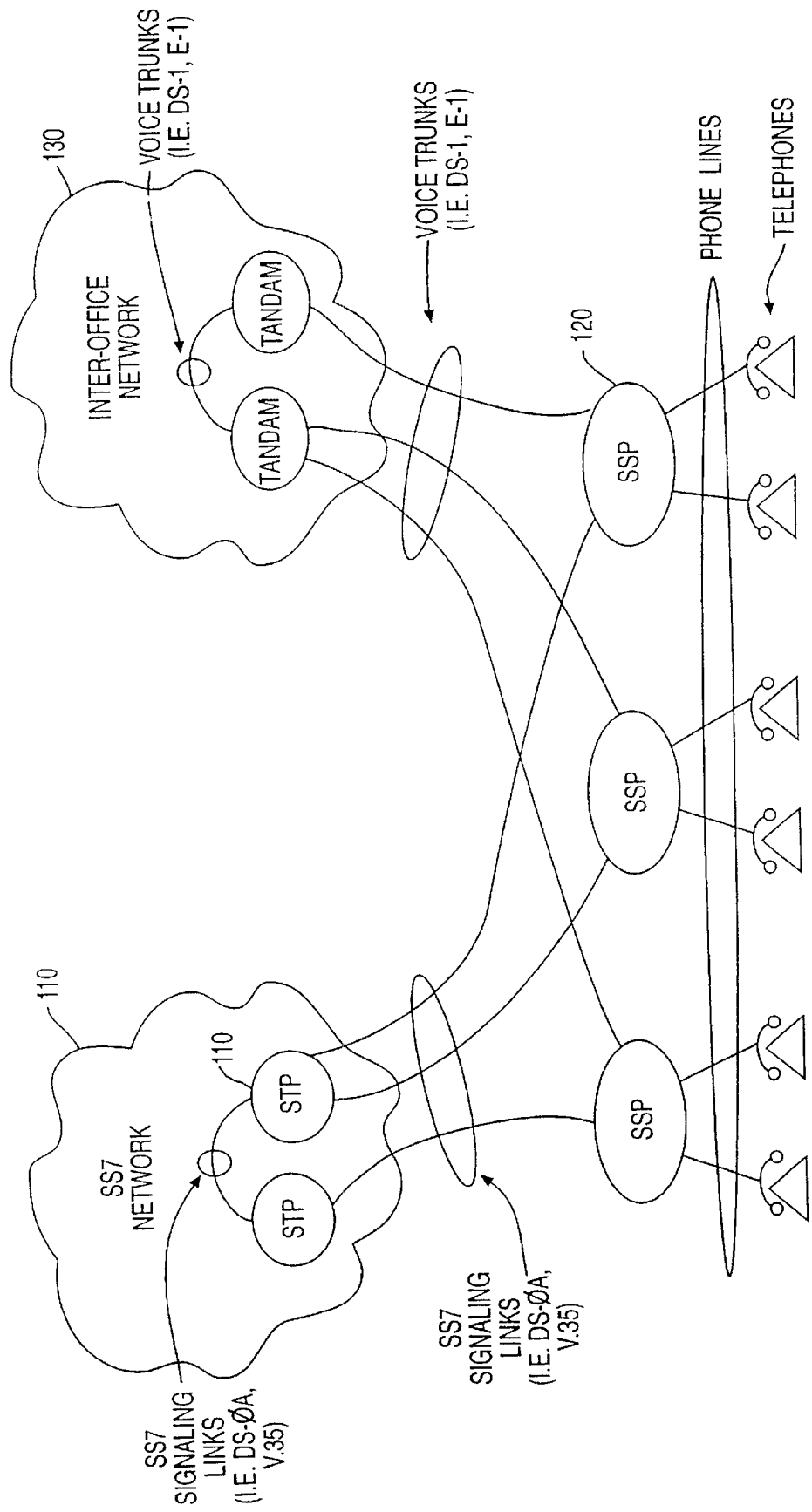
FIG. 1 illustrates a typical public switched telephone network (PSTN)
Figure 2:
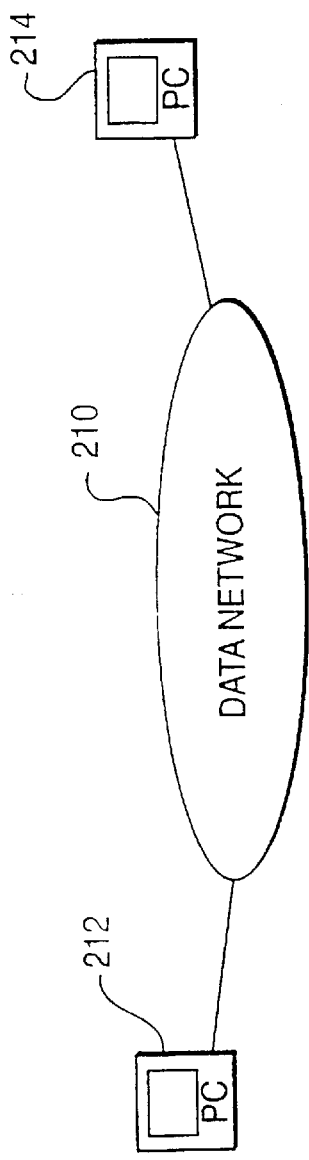
FIG. 2 illustrates a prior art data network system.
Figure 3:
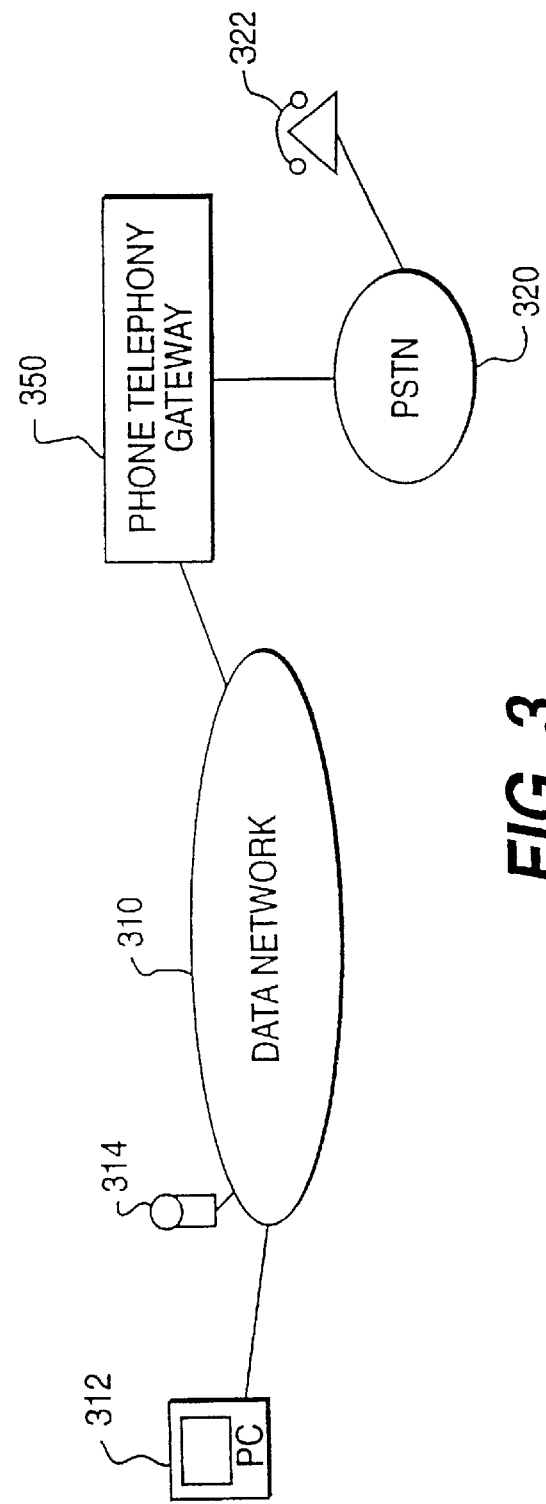
FIG. 3 illustrates a data network system having limited voice communications with a PSTN.
Figure 4A:
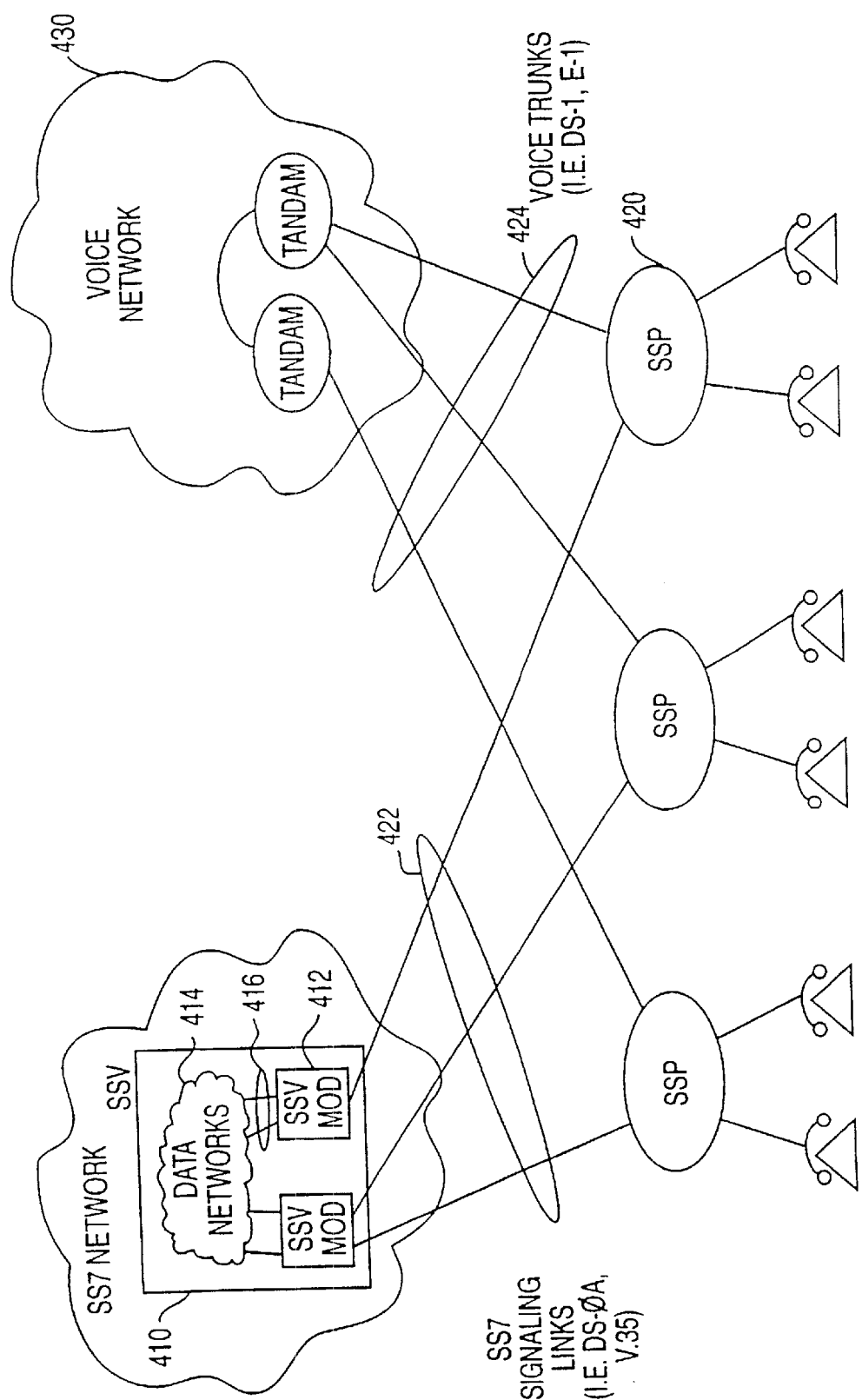
FIGS. 4A to 4C illustrate a signaling server based networks consistent with the present invention.
Figure 4B:
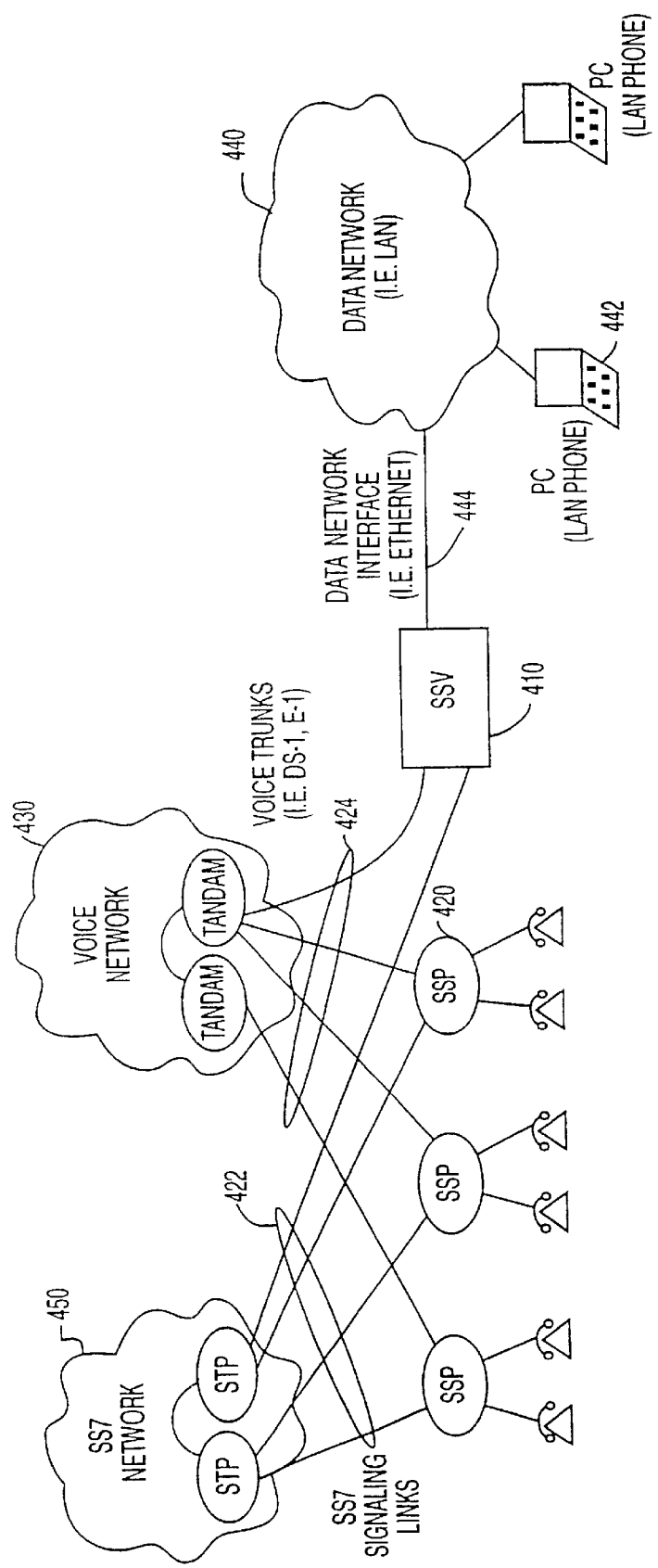
Figure 4C:
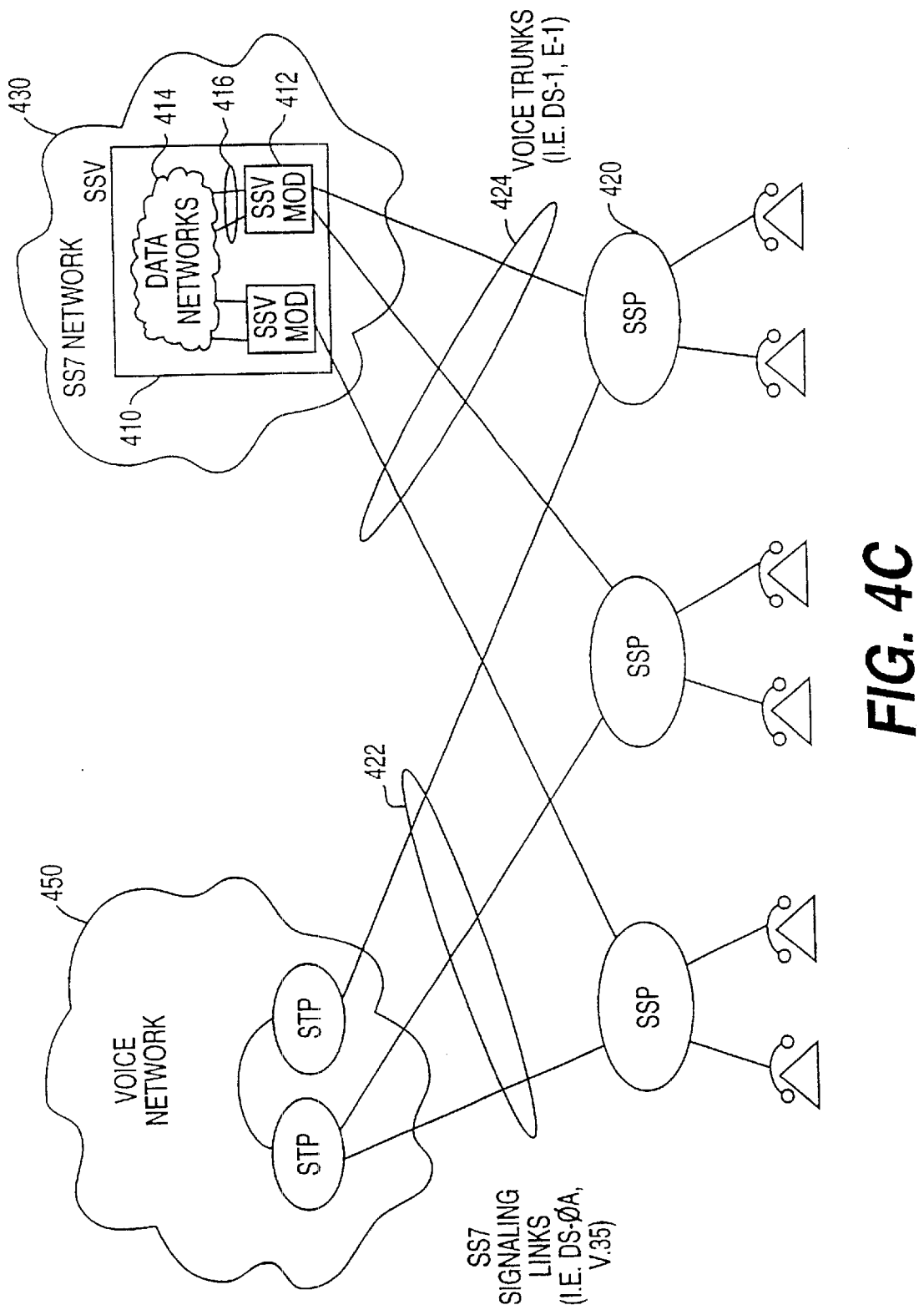

The signaling server may be used in a variety of network applications, as shown by FIGS. 4A to 4C. FIG. 4A illustrates a signaling server based network consistent with the present invention in which the signaling server replaces a portion of a CCS7 network. As shown in FIG. 4A, the signaling server based network includes a signaling server 410, a plurality of SSPs 420 and a voice network 430, such as a long-distance telephone network. SSPs 420 are each connected to signaling server 410 and voice network 430 by signaling links 422 and voice trunks 424, respectively.

Signaling server 410 further includes a plurality of signaling server modules 412 which connect to one or more signaling links 422. Signaling server modules 412 further connect to a server data network 414 through a plurality of redundant communication paths 416. Server data network 414 can then transfer signaling data from one signaling server module to another. In this way, SSPs 420 can communicate signaling data between each other though signaling server 410, effectively obviating the need for a separate CCS7 network.

Signaling links 422 transmit and receive data according to the CCS7 protocol. Signaling server modules 412 convert the CCS7 signaling information received over signaling links 422 into a message format acceptable for server data network 414. Signaling server modules 412 then forward the converted data to another signaling server module 412 connected to server data network 414 through redundant communication paths 416.

In systems consistent with the present invention, server data network 414 communicates data according to the asynchronous transfer mode (ATM) format. Accordingly, a signaling server 410 having an ATM server data network 414 will be described below. However, signaling server 410 may be used with server data networks 414 operating under other communication formats, such as the X.25 format or the TCP/IP addressing format used by the Internet.

FIG. 4B illustrates a signaling server based network consistent with the present invention in which the signaling server bridges a data network, such as the Internet, to a PSTN. As shown in FIG. 4B, a signaling server 410 allows a data network 440 to communicate voice and signaling data to voice network 430 and CCS7 network 450 of a PSTN. Computers 442, each include, for example, a modem and software for answering and initiating telephone calls, and are connected to data network 440. A high capacity link 444, such as an Ethernet, connects data network 440 to signaling server 410. Voice trunks 424 and signaling links 422, in turn, connect signaling server 410 to voice network 430 and CCS7 network 450, respectively.

Signaling server 410 receives voice data over trunks 424 and signaling data over links 422, and combines the received data for transmission over high capacity link 444. Data network 440 receives the combined data over link 444 and routes it to computer 442 that is addressed by the combined data. In addition, signaling server 410 converts the received data into a data format compatible with data network 440. Similarly, computer 442 can transmit voice and signaling data over data network 440 and high capacity link 444 to signaling server 410. When signaling server 410 receives voice and signaling data from data network 440, it will separate the combined voice and signaling data for outputting over respective voice bunks 424 and signaling links 422. The signaling server based network will thus allow all types of calls (i.e., local, long-distance, toll-free, or "1-900") to be placed from a computer 442 on data network 440 to a telephone connected to a SSP 420.

FIG. 4C illustrates a signaling server based network consistent with the present invention in which the signaling server replaces a portion of the voice network. As shown in FIG. 4C, the signaling server based network includes a signaling server 410, a plurality of SSPs 420 and a CCS7 network 450. SSPs 420 are each connected to signaling server 410 and CCS7 network 450 by voice trunks 424 and signaling links 422, respectively. In this way, SSPs 420 can communicate voice data between each other though signaling server 410, effectively obviating the need for the voice network.

Signaling Server

Figure 5:
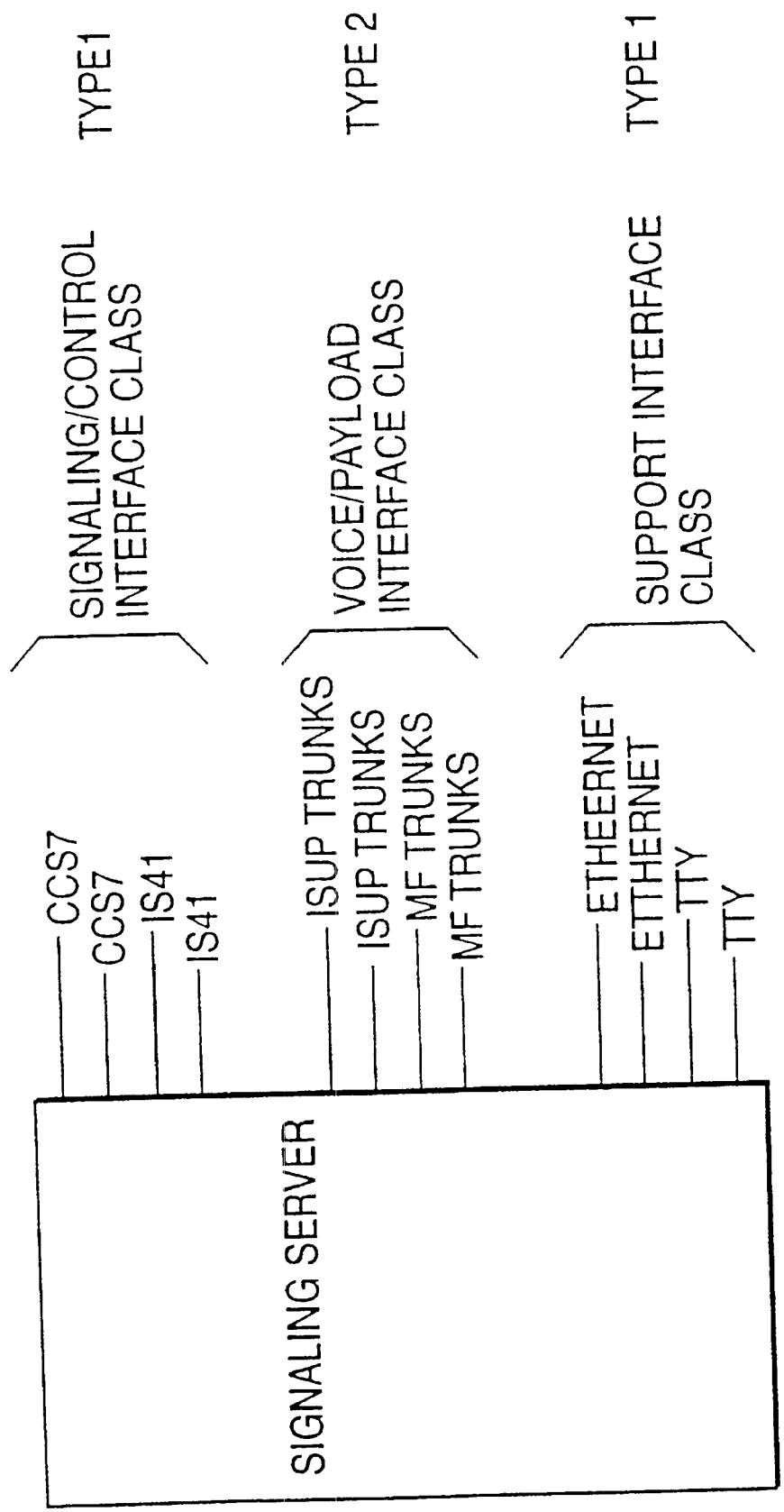
FIG. 5 illustrates the different types of data interfaces of the signaling server of FIG. 4.

As described above, the signaling server can transfer either signaling data, voice data, or both signaling and voice data. To this end, the signaling server includes a multiple of data interfaces for serving in a variety of applications. FIG. 5 illustrates the two types of interfaces associated with each signaling server. Type 1 interfaces include a signaling/control interface and a support interface, while Type 2 interfaces include voice/circuit switch interfaces. The signaling server may be configured to support any combination of these interfaces depending upon the particular type of application.

In the signaling servers of FIG. 4, for example, Type 1 interfaces are used to configure the signaling server of FIG. 4A, while Type 2 interfaces are used to configure the signaling server of FIG. 4C. The signaling server of FIG. 4B, however, is configured to interface with both Type 1 and Type 2 data since it transfers both signaling and voice data.

Type 1 interfaces communicate using protocol data units (PDUs), preferably using the ATM Adaption Layer 5 (AAL5) format. These interfaces have a delay characteristic which allows the signaling server to be tolerant of data delays and delay variations, and have a zero tolerance for corrupted data. Type 2 interfaces, on the other hand, communicate using a time division multiplexed (TDM) digital data stream, preferably using the ATM Adaption Layer 1 (AAL1) format. Type 2 interfaces have a low tolerance for data delays and delay variations, and, as opposed to Type 1 interfaces, can tolerate some amount of errors in the received data. The signaling server will then be configured differently for Type 2 interfaces than it will be for Type 1 interfaces.

Figure 6:
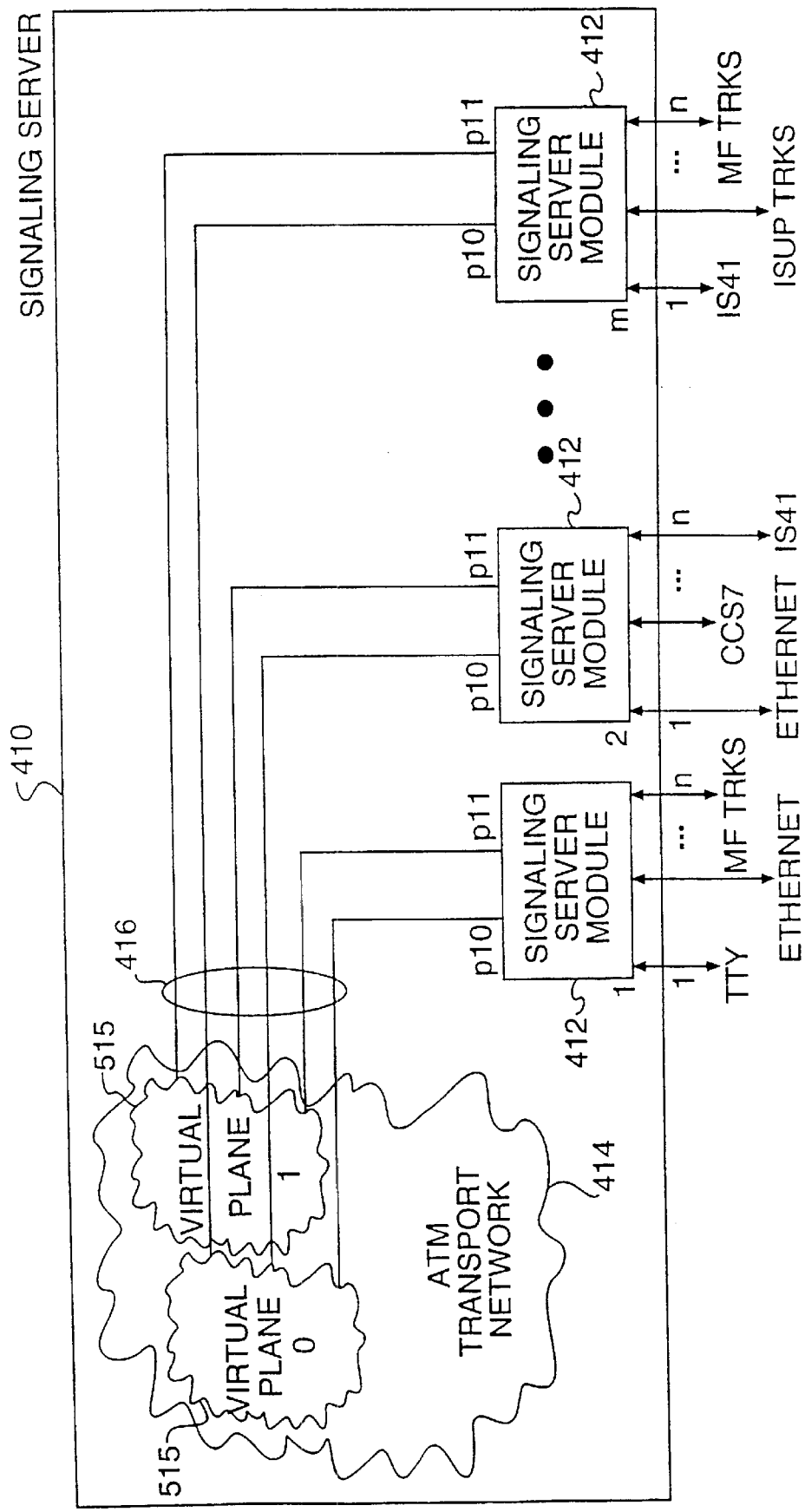
FIG. 6 illustrates the use of virtual dual planes for creating redundant communication paths which interconnect a plurality of signaling server modules located in the signaling server of FIG. 4.

As shown in FIG. 6, signaling server modules 412 communicate with one another through a virtual plane 615 located in server data network 414. Each signaling server module 412 transfers voice and/or signaling data over a plurality of redundant communication paths 416 to a corresponding virtual plane 615. Further, each virtual plane 615 terminates a corresponding redundant communication path 416 from each of the signaling server modules 412.

Server data network 414 may be a back plane connectivity network within signaling server 410 itself. In this case, the virtual planes are essentially a physical connection between signaling server modules 412. Signaling server network 414 may also comprise a separate data network, such as the Internet. The virtual planes will then be established by forming connections, through the separate server data network, for each redundant communication path 416.

Signaling Server Module

A signaling server module 412 will now be described in detail for use in the above signaling server 410. As stated above, signaling server module 412 may communicate either Type 1 data, Type 2 data, or both Type 1 and Type 2 data. For the sake of brevity, a universal signaling server module will be described which can communicate both types of data.

Figure 7:
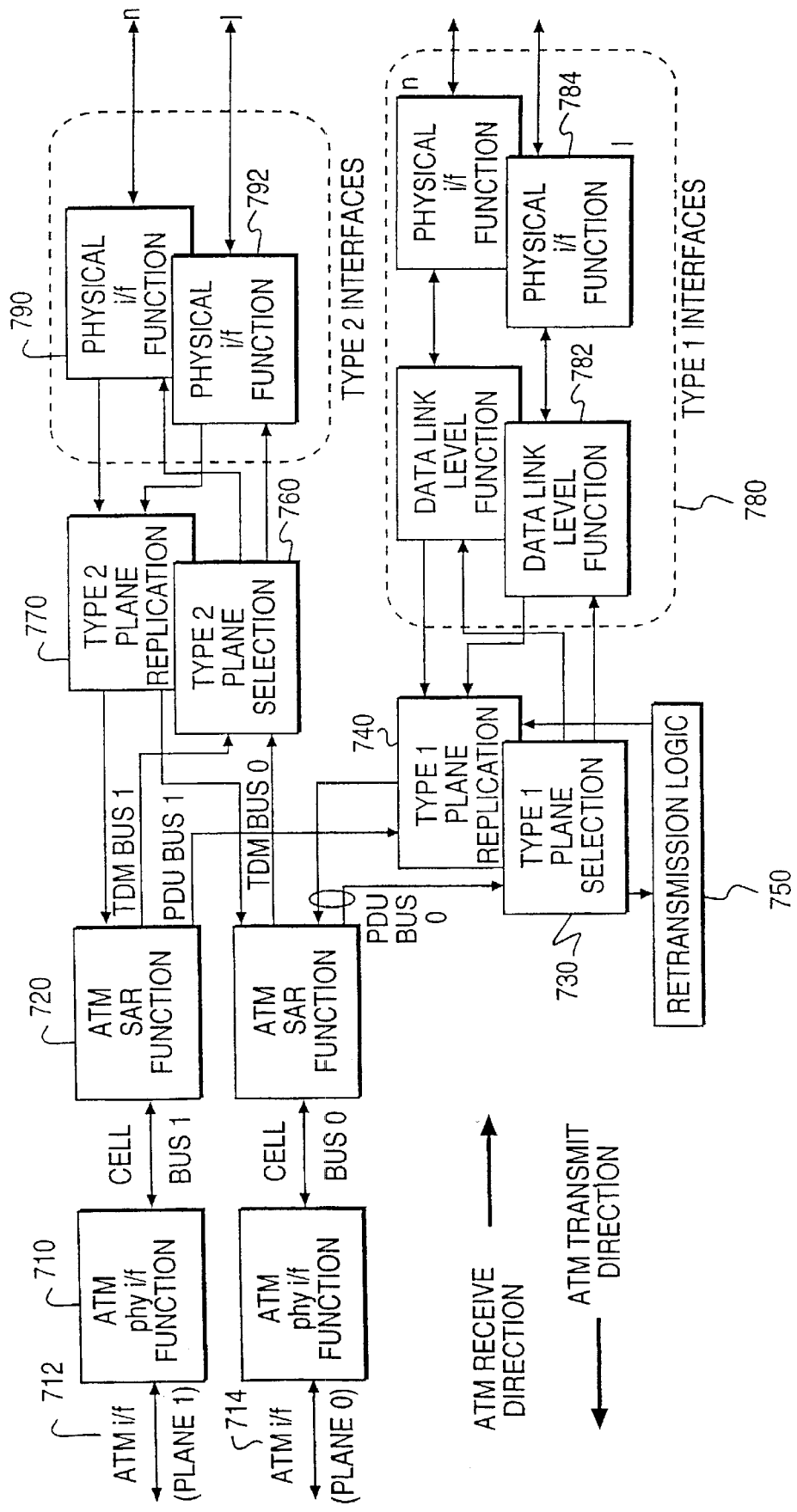
FIG. 7 is a block diagram of a signaling server module consistent with one embodiment of the present invention.

As shown in FIG. 7, a signaling server module includes data interfaces 710, data segmentation and reassembly (SAR) units 720, type 1 plane selection 730 and replication 740 units, re-transmission logic 750, type 2 plane selection 760 and replication 770 units, type 1 interface 780, and type 2 interface 790.

Although the signaling server module performs standard interfacing and data link level functions, it primarily performs a variety of redundant communication functions. These include data interface functions, data segmentation and reassembly (SAR) functions, and plane selection/replication functions. To this end, the signaling server module includes a multiple of data interfaces 710 each of which receives redundant voice and/or signaling data communicated over duplicated communication paths 712 and 714 (same as paths 416 of FIGS. 4A to 4C). This helps ensure that an error-free data cell may be received by the signaling server. Each path connects to a respective virtual plane. While the illustrated signaling server achieves redundancy through duplication (i.e., only two communication paths 712 and 714, and only two, ATM interfaces 710 are shown), higher order redundancy techniques, such as triplex, may be used.

When the signaling server module receives ATM data cells from the server data network, ATM interfaces 710 output the received ATM cells to respective ATM segmentation and reassembly (SAR) units 720 over corresponding redundant communication paths. Each ATM SAR unit 720 outputs Type 1 interface data on a PDU bus and outputs Type 2 interface data on a TDM bus.

Type 1 plane selection unit 730 receives over the PDU bus the PDUs from each ATM SAR unit 720, and selects the first PDU having no errors. Selection unit 730 preferably determines whether a PDU contains errors based on a cyclic redundancy check (CRC). As known in the art, a CRC involves running an equation on the data stream prior to transmission, and placing the result of the equation in a check sum field of the PDU (referred to as a CRC code). A receiver then runs the same equation on the transmitted data and checks its result against the result placed in the check sum field. If they match, no error has occurred. If they do not match, then an error occurred in the PDU.

Figure 8:
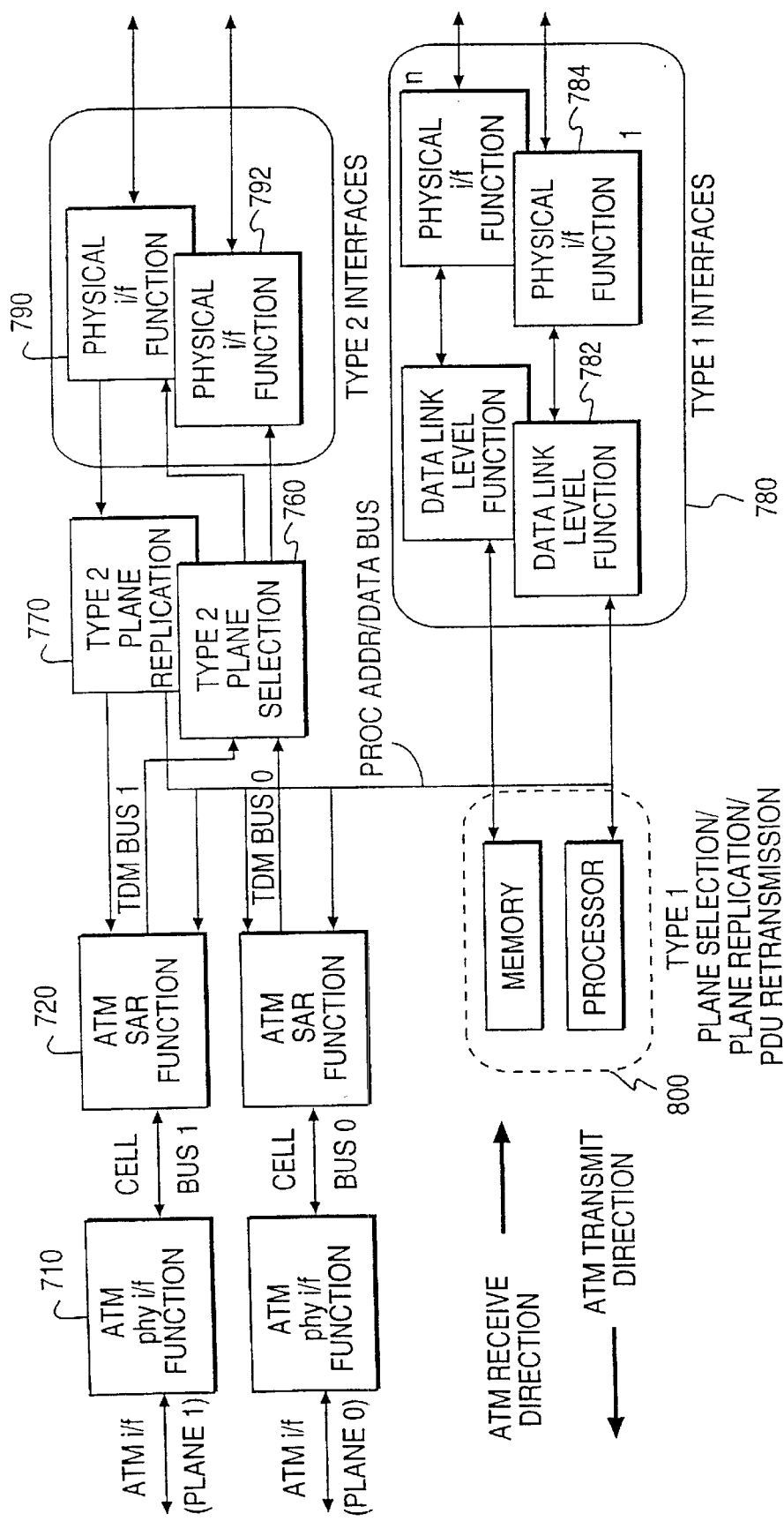
FIG. 8 is a block diagram of a second signaling server module consistent with another embodiment of the present invention.

If all of the PDUs received from redundant ATM SAR units 720 contain errors, then a re-transmission logic 750 requests that the sending signaling server module 412 re-transmit the particular PDU. Accordingly, Type 1 plane selection unit 730 can select a PDU on a PDU-by-PDU basis. As shown in FIG. 8, selection unit 730, replication unit 740 and re-transmission logic 750 of FIG. 8 may be implemented using a memory and a specially programmed microprocessor 800. Here the PDU bus is replaced with a microprocessor address/data bus. The same reference numbers have been used in FIG. 8 to refer to the same components as those of FIG. 7.

Type 2 selection unit 760 receives Type 2 interface data over the TDM bus. Since the AAL1 data cells do not contain a CRC code, Type 2 selection unit 760 determines cell error according to a different plane selection algorithm than that above. For example, Type 2 selection unit 760 may determine cell error by monitoring the signal level at ATM interface 710 or by taking a weighted average of the selected Type 1 PDUs. The AAL1 data units may also be modified to include an ATM adaption layer containing a CRC code. This would enable selection unit 760 to select TDM data units in the same way Type 1 selection unit 730 selects a PDU, as described above. Furthermore, since Type 2 interfaces have little tolerance for data delays and delay variations, a re-transmission logic is not associated with the Type 2 selection unit 760.

Once a data cell is selected by either Type 1 plane selection unit 730 or Type 2 plane selection unit 760, it is routed to either Type 1 interface 780 or Type 2 interface 790. Type 1 interface 780 includes data link level units 782 and an interface unit 784. Data link level units 782 receive data from plane selection unit 730, perform data link level functions, and output data to interface unit 784. Interface unit 784 is further connected to either a signaling link, or a data network, through respective bi-directional links. Type 2 interface 790 includes interface units 792 which receive data from plane selection unit 760 and output the data to a voice trunk through a bi-directional link.

When a signaling server receives data from either a signaling link, a voice trunk, or a data network, for transmission in ATM format to server data network 414, the data will be received at either Type 1 interface 780 or Type 2 interface 790, depending upon the received data's data type. Type 1 interface 780 forwards the received PDU data to a Type 1 plane replication unit 740 which transmits replicated PDUs to ATM SAR units 720. The ATM data cells are then transmitted over each of the redundant communication paths to server data network 414. Similarly, Type 2 interface 790 forwards the received TDM data units to a Type 2 plane replication unit 770 which transmits the replicated TDM data units to ATM SAR units 720. The ATM data cells are then transmitted over each of the redundant communication paths to server data network 414.

Figure 9:
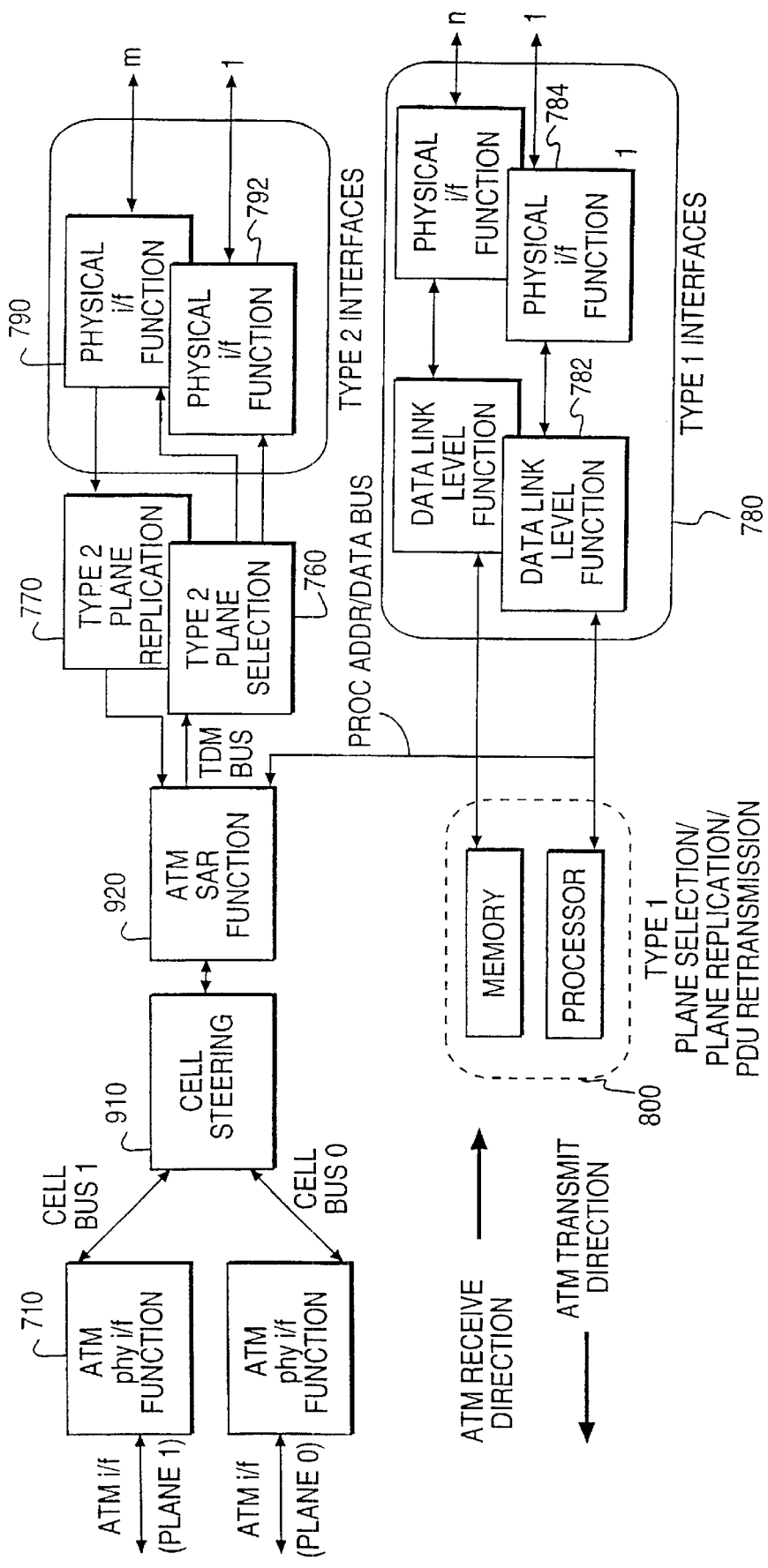
FIG. 9 is a block diagram of a third signaling server module consistent with yet another embodiment of the present invention.

FIG. 9 illustrates a second signaling server consistent with the present invention. The signaling server of FIG. 9 is the same as that shown in FIG. 7 with the exception that the plurality of ATM SAR units have been replaced with a cell steering unit 910 and a single ATM SAR unit 920. Each of the other units are the same as those shown in FIG. 7, and, therefore, will not be further described.

Figure 10:
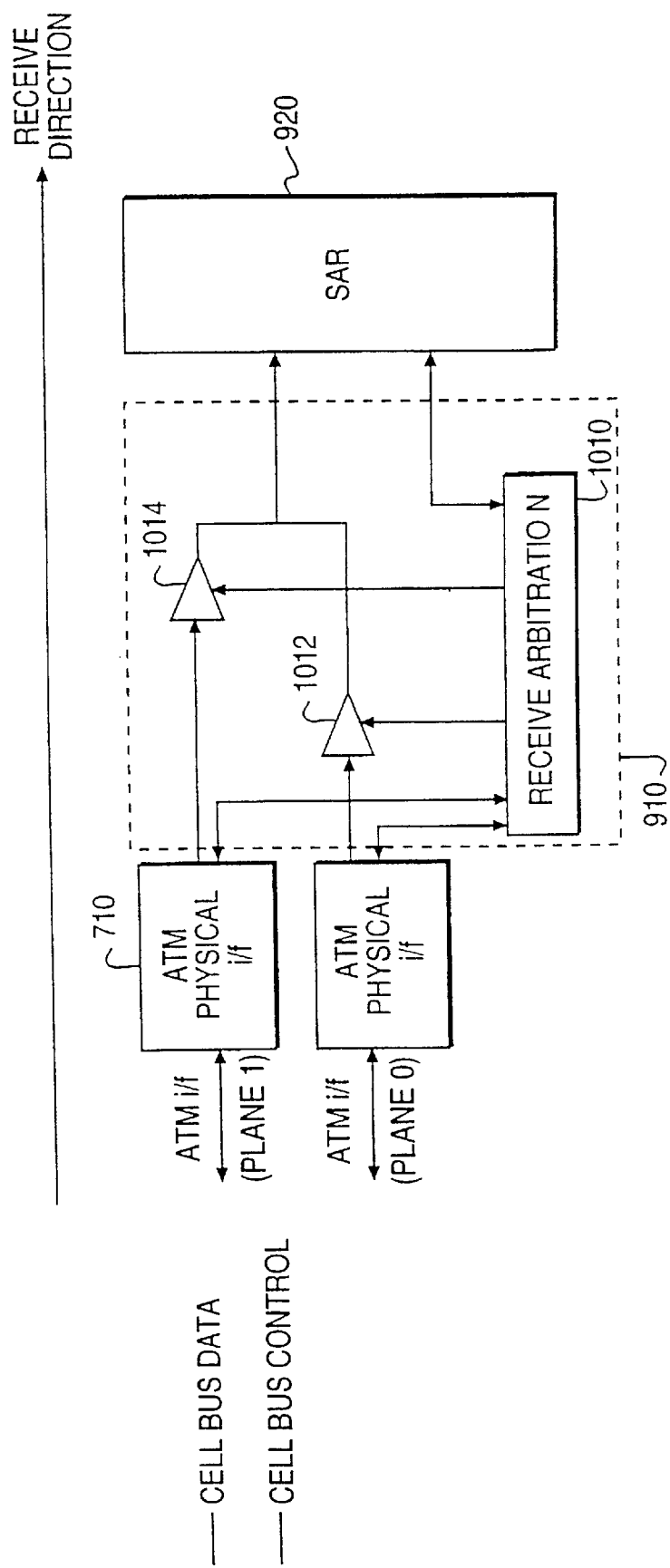
FIGS. 10 and 11 illustrate the receive and transmit cell steering functions, respectively, of the signaling server module of FIG. 9.

Cell steering unit 910 multiplexes cell data received from each ATM interface 710 into a single cell data stream to be output to ATM SAR unit 920. As shown in FIG. 10, an arbitration function unit 1010 controls the multiplexing of cell steering unit 910 by controlling access to the cell bus by ATM interfaces 710. Arbitration function unit 1010 outputs and receives controls signals from ATM interfaces 710 and SAR unit 920. When ATM interfaces 710 are ready to transmit data to SAR unit 920, arbitration function unit 1010 controls bus limiters 1012 and 1014 such that only one ATM interface 710 has access to the cell bus of SAR unit 920 at any one time. At this time, arbitration function unit 1010 will also control SAR unit 920 to receive the ATM data units output over the cell bus. The plane selection algorithm then forwards the first PDU output from SAR unit 920 having no errors, as described above in reference to FIG. 7.

Figure 11:
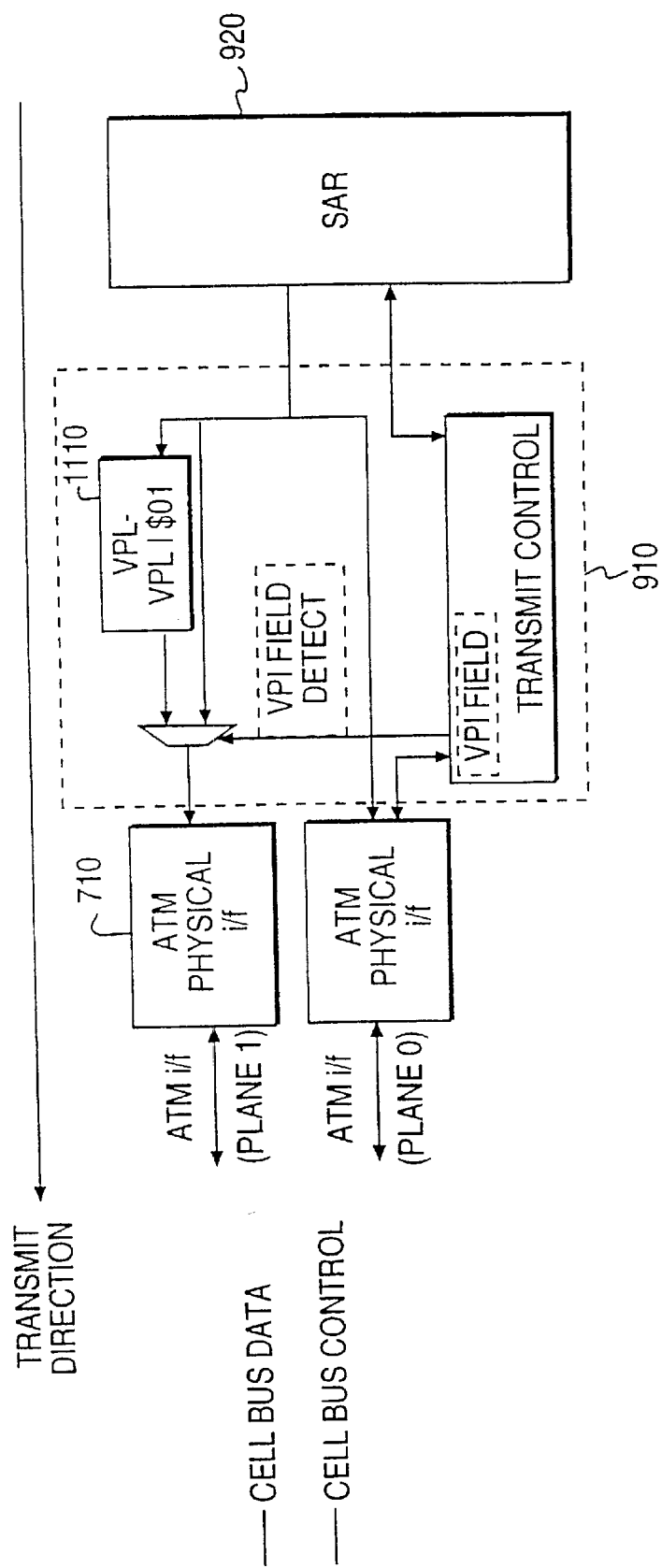

In order to allow the single SAR unit 920 to differentiate which data cell belongs to which ATM interface 710, the multiplexed ATM data cells must be modified to permit this differentiation. As well known, each ATM cell contains a header that identifies the cell and the cell's connections, and a payload that follows the header in the ATM cell and carries information intended for a recipient. The ATM header includes a virtual path identifier (VPI) and a virtual channel identifier (VCI) label, together indicating the transport connection for user information within payload and other information. The VPI field of each cell can then be modified such that it uniquely identifies the ATM interface from which the particular cell originated. FIG. 11 illustrates a cell steering unit for modifying the VPI field in the transmit direction. Processing then proceeds in the manner described above with respect to FIG. 7.

As shown in FIG. 11, when cell steering unit 910 transmits data to ATM interface 710 for output to the data network, it duplicates each cell so that each cell is transmitted to each ATM interface 710. Since ATM SAR unit 920 outputs each cell having the same VPI field and the signaling server transmits data units having VPI fields that identify which ATM interface it was transmitted from, cell steering unit 910 modifies one of the VPI fields of the data units received from ATM SAR unit 920. FIG. 11 functionally illustrates this VPI modification during transmission. Cell steering unit 910 duplicates the cell received from ATM SAR unit 920 and then modifies the VPI of the duplicated cell. In system consistent with the present invention, the VPI field prior to modification will already be set to identify one of the ATM interfaces, and, thus, only the VPI fields of those data units pertaining to the other ATM interfaces will need to be modified. For example, as shown in FIG. 11 by functional block 1110, only the VPI field of plane 1 is modified by cell steering unit 910.

Conclusion

Signaling servers consistent with the present invention provide a universal, high speed, highly reliable gateway for enabling voice and signaling communication between a data network and a PSTN. Signaling servers consistent with this invention may also be used to communicate signaling data in place of a CCS7 network or may be used to communicate voice data in place of a voice network, such as a typical long-distance telephone network. These advantages are achieved through use of redundant communication paths and error correction. It will be apparent to those skilled in the art that various modifications and variations can be made to the system and method of the present invention without departing from the scope of the invention. The present invention covers the modifications and variations of this invention provided they come within the scope of the appended claims and their equivalents.

What is claimed is:

1. A method of communicating telephonic data regarding a call over a data network, comprising the steps of:

receiving data units from a first data network over redundant communication paths;

multiplexing the received data units of each redundant communication path into a single data stream;

determining whether data units of the multiplexed data stream have an error;

forwarding data units that do not have errors to a second data network, wherein the receiving step includes the substep of receiving voice and signaling data units from the first data network over redundant communication paths; and the determining step includes determining whether received signaling data units have an error according to a first error check routine and determining whether received voice data units have an error according to a second error check routine.

2. A method of communicating telephonic data regarding a call over a data network, comprising the steps of:

receiving data units from a first data network over redundant communication paths;

multiplexing the received data units of each redundant communication path into a single data stream;

determining whether data units of the multiplexed data stream have an error;

selecting one of the multiplexed units determined not to have an error; and forwarding the selected data unit to a second data network;

wherein each redundant communication path terminates at an asynchronous transfer mode (ATM) interface located in a signaling server module, and the receiving step includes the substep of receiving ATM signaling data units, at each ATM interface, from the first data network.

3. A signaling server for communicating telephonic data over a data network, the signaling server comprising:

a plurality of first interface units for receiving signaling data units from a first data network over redundant communication paths;

a cell steering unit for receiving from the plurality of first interface units the received data units and multiplexing the data units into a single data stream;

a segmenting and reassembling unit for receiving the multiplexed data stream;

means for determining whether the received data units have an error;

a selection unit for selecting one of the data units determined not to have an error; and a plurality of second interface units for forwarding the selected data unit to a second data network.

4. A method of communicating telephonic data regarding a call over a data network, comprising the steps of:

receiving data units from a first data network over redundant communication paths at a cell steering unit and multiplexing the data units into a single data stream, including means for modifying the header of a received data unit to distinguish the data units of a redundant communication path from the data units of the other redundant communication paths, and means for modifying a virtual path identifier field of asynchronous transfer mode (ATM) cells;

determining whether data units of the multiplexed data stream have an error;

selecting one of the multiplexed units determined not to have an error;

forwarding the selected data unit to a second data network;

receiving signaling data units in the form of asynchronous transfer mode (ATM) cells, including a header portion, from the second data network;

replicating the received ATM cells; and transmitting the received and replicated ATM cells over the redundant communications paths to the first data network in a data format under which the first data networks operates.

5. A signaling server for communicating telephonic data over a data network, the signaling server comprising:

a plurality of first interface units for receiving signaling data units in the form of asynchronous transfer mode (ATM) cells, each data unit including a header portion, from a first data network over redundant communication paths;

a cell steering unit for receiving from the plurality of first interface units the received data units and multiplexing the data units into a single data stream, the cell steering unit including means for modifying the header of a received data unit to distinguish the data units of a redundant communication path from the data units of the other redundant communication paths and means for modifying a virtual path identifier field of asynchronous transfer mode (ATM) cells;

means for determining whether the received data units have an error; a selection unit for selecting one of the data units determined not to have an error;

a plurality of second interface units for forwarding the selected data unit to a second data network.

6. A signaling server for communicating telephonic signaling data over data networks, the signaling server comprising:

connections to a plurality of service switching points (SSPs) via signaling links;

connections to one or more data networks through redundant communications paths;

a converter for translating telephonic signaling data units received over a signaling link into reformatted data units for transmission over one or more data networks, and for translating reformatted data units received from a data network into telephonic signaling data units for transmission to one or more SSPs;

an error detector for examining data units received over redundant communications paths and determining whether the received data units contain errors; and a selection unit for selecting one of the data units determined not to have an error for transmission.

* * * * *